United States Patent [19]
Kobayashi

[11] 3,879,065
[45] Apr. 22, 1975

[54] PIPE COUPLING ASSEMBLY USABLE FOR SANITARY APPLIANCES

[75] Inventor: Yoshikazu Kobayashi, Tokyo, Japan

[73] Assignee: Nitto Kohki Co., Ltd., Tokyo, Japan

[22] Filed: Aug. 27, 1973

[21] Appl. No.: 391,594

[30] Foreign Application Priority Data
Dec. 26, 1972 Japan.............................. 47-481006
May 17, 1973 Japan............................ 48-4854118

[52] U.S. Cl. ................. 285/39; 285/162; 285/169; 285/328; 285/338; 285/340; 285/341; 285/DIG. 11
[51] Int. Cl. ............................................. F16l 35/00
[58] Field of Search ........... 285/196, 338, 161, 162, 285/341, 169, 8, 107, 328, 109, 340, DIG. 11, 39

[56] References Cited
UNITED STATES PATENTS

| | | |
|---|---|---|
| 402,600 | 5/1889 | Kemp............................ 285/338 X |
| 966,748 | 8/1910 | Honecker ........................... 285/338 |
| 1,108,313 | 8/1914 | Anderson........................ 285/338 X |
| 1,177,338 | 3/1916 | Kayfetz............................... 285/338 |
| 1,506,564 | 8/1924 | Cattoni............................. 285/39 X |
| 2,700,774 | 2/1955 | Smith........................... 285/DIG. 11 |
| 3,058,760 | 10/1962 | Bonkowski...................... 285/338 X |
| 3,659,883 | 5/1972 | Kojima.............................. 285/348 |

Primary Examiner—Dave W. Arola

[57] ABSTRACT

A pipe coupling assembly is joined quite stably with an objective body wall through a diametrical elastic expansion of a flexible cylindrical body combined with the lower part of its main body caused by axial turning of the latter and with a water pipe by a joining and locking mechanism incorporated in the upper part thereof, both being in water tight dispositions and practiced by simple hand operations which can be very easily carried out even by unskilled operators.

23 Claims, 18 Drawing Figures

PIPE COUPLING ASSEMBLY USABLE FOR SANITARY APPLIANCES

The present invention relates to an improved pipe coupling assembly usable for sanitary appliances and, more particularly relates to an assembly suited for coupling a water pipe with an objective body wall such as a wall of sanitary appliances in a water tight disposition.

Generally, objective bodies such as sanitary appliances, e.g., wash basins, lavatories, water closets, shampoo urinals, drinking fountains, cuspidors, bidets, laboratory sinks, laundry sinks, service sinks, slop sinks, tanks and both tubs, are made of non-metallic materials like glass, ceramics or synthetic resins. Therefore, it is difficult to provide such an objective body with a hole with flange or a threaded hole for junction with a water pipe. In most cases, for the junction in this sense, there is formed only a straight hole or a hole diverging towards the inside of the objective body wall.

In order to join a water pipe with an objective body wall of this type, there is conventionally proposed a specical pipe coupling assembly which is provided with a conical skirt formed on the lower part of the main body of the assembly. In the joining operation, the conical skirt is inserted in the first place into the hole of the objective body wall and, secondly, a seal member is compulsorily inserted into a gap between the skirt and the objective body wall surface. Next, by turning a cap nut screwed over the upper part of the main body, the main body with the conical skirt is pulled upwards and the seal member is compressed for establishment of a water tight junction between the assembly and the objective body wall.

In the above-described procedure, the compulsory insertion of the seal member requires a considerable time and labor consuming troublesome work and highly trained skillfulness of the operator. In addition, due to the particular structure of the objective body such as the sanitary appliance, the joining of the water pipe to the objective body needs in general to be performed from outside of the latter and this further amplifies the difficulty and complexity in the joining work.

Further, when the objective body is provided with a junction hole of a straight type, the coupling assembly of the above-described type with the conical skirt cannot successfully join the assembly with the objective body wall.

It is a primary object of the present invention to provide an assembly for reliably coupling water pipes with objective body walls by a simple operation which can be easily practiced even by unskilled operators.

It is another object of the present invention to provide an assembly for stably coupling water pipes with objective body walls by handling the assembly from outside of the objective bodies only.

It is still another object of the present invention to provide an assembly for successfully coupling water pipes with objective body walls regardless of the type of junction holes formed through the objective body wall.

In order to attain the above-described objects, the pipe coupling assembly includes a flexible cylindrical body disposed to the lower part of the main body and a joining and locking mechanism incorporated in the upper part of the main body. Upon axial turning of the main body by manual operation, the flexible cylindrical body expands diametrally in order to be in a water tight pressure contact with the wall of the junction hole.

Further features and advantages of the pipe coupling assembly of the present invention will be made clearer from the ensuing description, reference being made to the embodiments shown in the accompanying drawings, in which;

Figure 1:
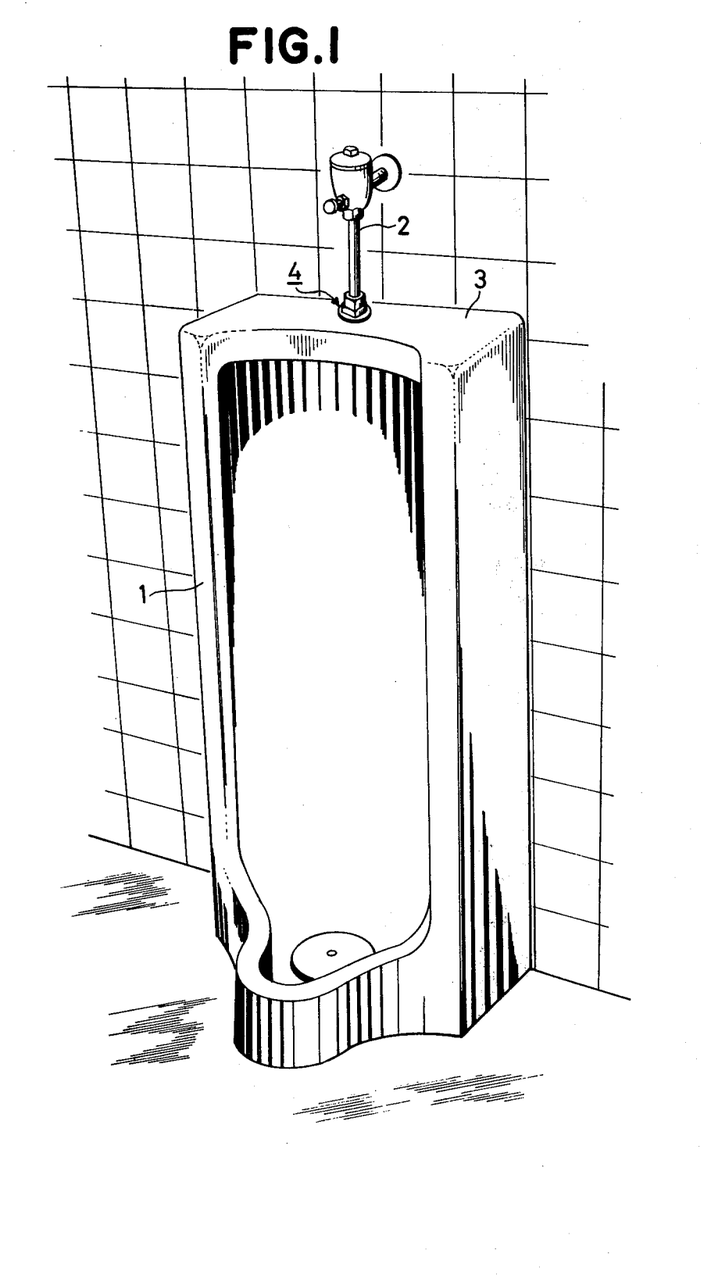
FIG. 1 is a perspective plane view of a urinary closet for which the pipe coupling assembly of the present invention can be desirably used.

Now, referring to FIG. 1, there is shown an example of sanitary appliances, i.e. urinary closets, for which the pipe coupling assembly of the present invention is desirably usable. Namely, in order to flush water into the urinary closet 1, there is provided a water pipe 2 the upstream end of which is connected to a suitable water supply source (not shown) while the downstream end of which is connected to a water discharge hole excavated through the upper wall 3 of the closet 1. The pipe coupling assembly 4 of the present invention is disposed to the junction of the water pipe with the water discharge hole of the closet upper wall 3.

In this connection, however, it should be understood that the application of the pipe coupling assembly of the present invention is not limited to a vertical junction like this type only. It is suited for a horizontal junction and for any type of slant junction. Therefore, although the ensuing description substantially covers the use of the pipe coupling assembly of the present invention for the vertical type junctions, the term "upper" should be understood as denoting in general the upstream side of the water flow whereas the term "lower" should be uderstood as denoting in general the downstream side of the water flow through the assembly and pipes.

Figure 2:
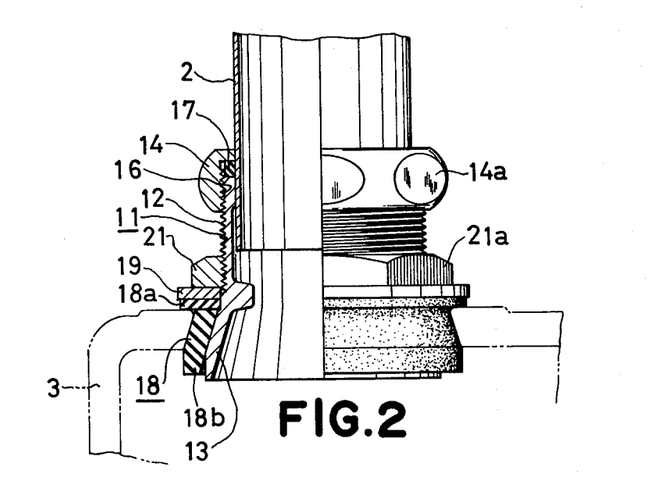
FIG. 2 is a side plane view, half in section, of a typical example of the conventional type pipe coupling assembly.

For a better understanding of the present invention, a typical example of the conventional pipe coupling assembly is shown in FIG. 2 and a brief explanation will hereinafter be made as to the structure and the setting of same.

A cylindrical main body 11, which is joined with the water pipe 2 at its upper end part, is provided with an outer thread 12 formed on the upper part surface thereof and a downwardly diverging skirt 13 on the lower part thereof. To the upper end part of the main body 11, there is disposed a cap nut 14 via a screw engagement between an inner thread 16 thereof and the outer thread 12, the cap nut 14 being provided with outer surfaces 14a suited for engagement with wrenches. A seal ring 17 is inserted in between the inner upper surface of the cap nut 14 and the upper end surface of the main body 11.

A seal member 18 is inserted in between the skirt 13 and the peripheral wall of a hole formed through the wall of the objective body, e.g., the upper wall 3 of the urinary closet. This seal member 18 is composed of a skirt part 18b and a flange part 18a. A washer 19 is placed over the flange part 18a of the seal member 18 while being drpressed by a nut 21 screwed over the outer thread 12 of the main body 11. This nut 21 is provided with outer surfaces 21a suited for engagement with wrenches.

In the fitting of the water pipe 2 to the hole of the wall 3 of the objective body, all of the parts are assembled together in the first place and the lower skirt 13 of the assembly is inserted into the hole of the objective body wall 3. While keeping this condition, the seal member 18 is compulsorily inserted into a gap between the skirt 13 and the objective body wall 3 by hand. This step of insertion of the seal 18 requires considerable time and labor consuming troublesome work and highly trained skillfulness of the operator. After the seal member 18 is inserted in position, the lower end of the water pipe 2 is inserted into the main body 11 and the upper cap nut 14 is fastened while restraining the turning of the lower nut 21 by a wrench. Then, due to the screw engagement between the inner and outer threads 16 and 12, the main body 11 is pulled upwards and presses the seal ring 17 vertically thereby the inner face of the seal ring 17 is put into a pressure contact with the peripheral surface of the water pipe 2. On the other hand, the skirt 13 of the main body 11 is naturally pulled upwards and the seal member 18 is sandwiched in between the outer surface of the skirt 13 and the hole wall of the objective body wall 3 under pressure.

Due to particular structure of the objective bodies such as sanitary appliances, the joining of the water pipes to the objective bodies needs in general to be performed from outside of the objective bodies and this further amplifies the difficulty and complexity in the joining works.

A basic embodiment of the pipe coupling assembly of the present invention is shown in FIGS. 3, 4A, 4B and 5, in which a cylindrical main body 101 is provided with an upper part 101a adapted for accommodation of a later described mechanism for joining the water pipe 2 with the assembly 4, an angled surface part 101b adapted for engagement with wrenches, a lower part 101d which is provided with a threaded outer surface 102 and a stepped part 101c which is formed just below the angled surface part 101b.

Figure 3:
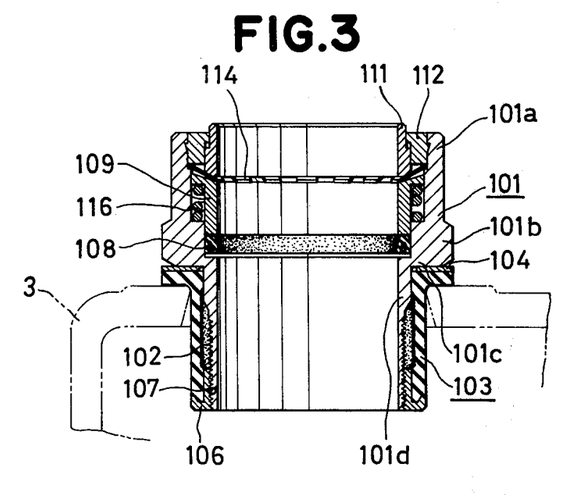
FIG. 3 is a cross sectional side plane view of an emmbodiment of the pipe coupling assembly of the present invention.

Embracing the lower part 101d of the main body 101 in partial contact therewith, there is provided a cylindrical body 103 made up of a resiliently flexible material. This flexible cylindrical body 103 is accompanied with a washer 104 fixed to the uppersurface of the upper flange part 103a thereof and a ring 106 fixed to the lower end thereof. This ring 106 is provided with an inner screw 107 adapted for a screw engagement with the threaded outer surface of the lower part 101d of the main body 101.

Now, the explanation will be given with respect to the mechanism for joining the water pipe 2 with the assembly 4 and the encased inside of the upper part 101a of the cylindrical main body 101. As shown in detail in FIG. 4A, inside the upper part 101a of the main body 101, an annular seal member 108 is disposed on the inside uppersurface of the stepped part 101c of the main body 101 while having a diametral cross section of an inversed U-shaped profile. The outer diameter of this annular seal member 108 is almost equal to the inner diameter of the angled surface part 101b of the main body 101.

Figure 4A:
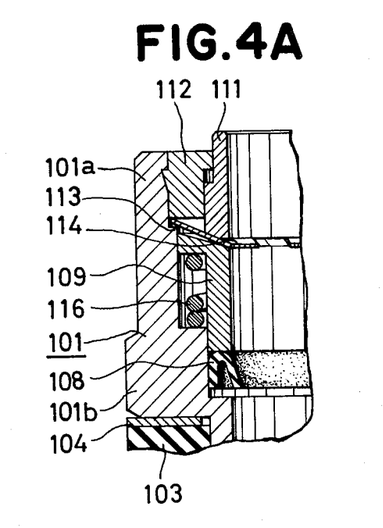
FIG. 4A is an enlarged cross sectional side plane view of a part of the pipe coupling assembly shown in FIG. 3.
Figure 4B:
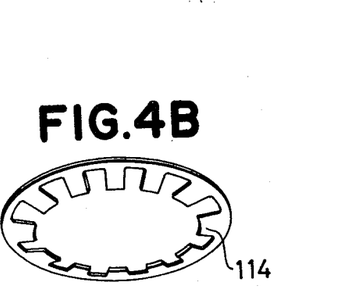
FIG. 4B is a perspective plane view of a catcher ring used in the pipe coupling assembly shown in FIG. 3.

At a position just above the annular seal member 108, there is provided a guide ring 109 of an inverted L-shaped diametral cross sectional profile with the lower end of its lower cylindrical part being in contact with the upper fringe of the annular seal member 108. The uppersurface of the upper flange part of the guide ring 109 diverges conically. Encircling the cylindrical part of the guide ring 109, there is disposed a compression spring 116 in between the undersurface of the upper flange part of the guide ring 109 and the inside uppersurface of the angled surface part 101b of the main body 101.

A movable piece 111 of a cylindrical shape is inserted within the upper part 101a of the main body 101 and, in order to restrain free upward movement of this movable piece 111, a stopper ring 112 is fixed to the inner surface of the upper part 101a of the main body 101. For the sake of the restraining the free upward movement of the movable piece 111, the outer diameter of the lower half of the movable piece 111 is designed as larger than that of the upper half thereof while, in accordance with this, the inner diameter of the lower half of the stopper ring 112 is designed as larger than that of the upper half thereof.

In between the movable piece 111 and the upper flange part of the guide ring 109, there is provided a catcher ring 114. As shown in detail in FIG. 4B, this catcher ring 114 is conically converged downwards and its inner peripheral fringe is provided with indentations. The outer fringe of the catcher ring 114 is accommodated in a space between the lower end of the stopper ring 112 and an annular step 113 formed on the inner surface of the upper part 101a of the main body 101. The inner diameter of the catcher ring 114 is formed somewhat smaller than the inner diameter of the lower part 101d of the main body 101.

Generally, objective bodies such as sanitary appliances are made of non-metallic materials like glass, ceramics or synthetic resins and their walls 3 are provided with holes adapted for coupling with water pipes 2, the holes diverging towards the insides of the objective body walls.

In the coupling process of the assembly of the present invention, the lower parts of the assembly, i.e., the lower part of the flexible cylindrical body 103, the ring 106 and the lower part 101d of the main body 101, are inserted into the hole of the objective body wall 3, e.g., the hole of the upper wall 3 of the urinary closet 1, with the undersurface of the upper flange part 103a of the flexible cylindrical body 103 being in close contact with the outer surface of the objective body wall 3. (see FIG. 3)

Then the main body 101 of the assembly is turned axially by engaging a wrench with the angled surface part 101b thereof. By this turning of the main body 101, the ring 106 is pulled upwardly due to the screw engagement of its inner screw 107 with the threaded outer surface 102 of the lower part 101d of the main body 101.

Figure 5:
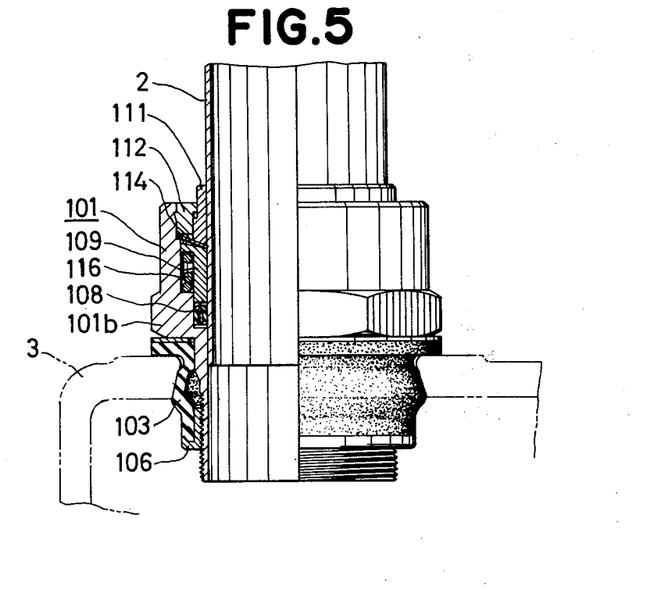
FIG. 5 is a cross sectional side plane view of the pipe coupling assembly shown in FIG. 3 in a disposition after coupling.

This upward movement of the ring 106 cuases a corresponding outward bending of te cylindrical wall part of the flexible cylindrical body 103. In other words, the cylindrical body 103 is inflated diametrally. Due to this diametral inflation, the flexible cylindrical body 103 comes into a tight pressure contact with the peripheral wall of the hole of the objective body wall 3 as shown in FIG. 5. As a result, the coupling assembly of the present invention is joined to the objective body wall 3 in a water tight disposition. In the above-described procedure, axial turning of the ring 106 caused by the axial turning of the main body 101 is effectively prevented by the close frictional contact of the upper flange part 103a of the flexible cylindrical body 103 with the outer surface of the objective body wall 3.

After completion of the coupling of the assembly to the objective body, the water pipe 2 needs to be joined with the assembly of the present invention. In this procedure, the movable piece 111 is depressed by hand overcoming the repellent force by the compression spring 116 and, thereby, the catcher ring 111 is depressed also. Due to this depression, the inner diameter of the catcher ring 114 is enlarged to the extent of the inner diameter of the lower part 101d of the main body 101.

While keeping this disposition, the water pipe 2 is inserted over a prescribed length into the cylindrical main body 101 from the upper side. After the water pipe 2 is sufficiently inserted, the depressing of the movable piece 111 is stopped and the same is therefore pushed upwardly by the repellent force by the compression spring 116. The catcher ring 114 is consequently pushed upwardly by the upper surface of the upper flange part of the guide ring 109 so as to resume its initial inner diameter. In other words, through this resumption of the initial small inner diameter, the indentations formed on the inner peripheral fringe of the catcher ring 114 bite the outer surface of the water pipe 2. In this way, the water pipe 2 is joined with the assembly of the presnet invention in a water tight disposition via the inner seal member 108.

When the water pipe 2 should be disconnected from the coupling assembly of the present invention, the movable piece 111 is depressed so that the catcher ring 114 is liberated from the bite on the water pipe and the latter is drawn out of the assembly very easily.

For removal of the assembly from the objective body wall 3, the main body is turned again by the wrench in the direction opposite to that at the time of juncture, the ring 106 is moved downwardly due to the screw engagement and the flexible cylindrical body 103 resumes its initial straight shape shown in FIG. 3, thereby the assembly can be taken off the objective body wall 3 very easily.

Figure 6:
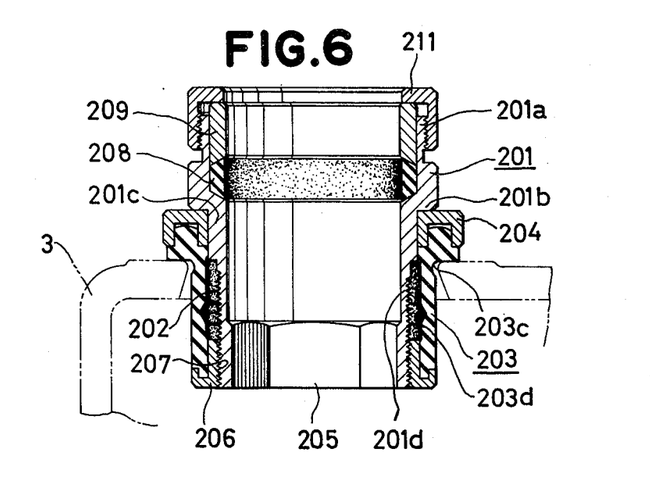
FIG. 6 is across sectional side plane view of another embodiment of the pipe coupling assembly of the present invention.
Figures 7, 9:
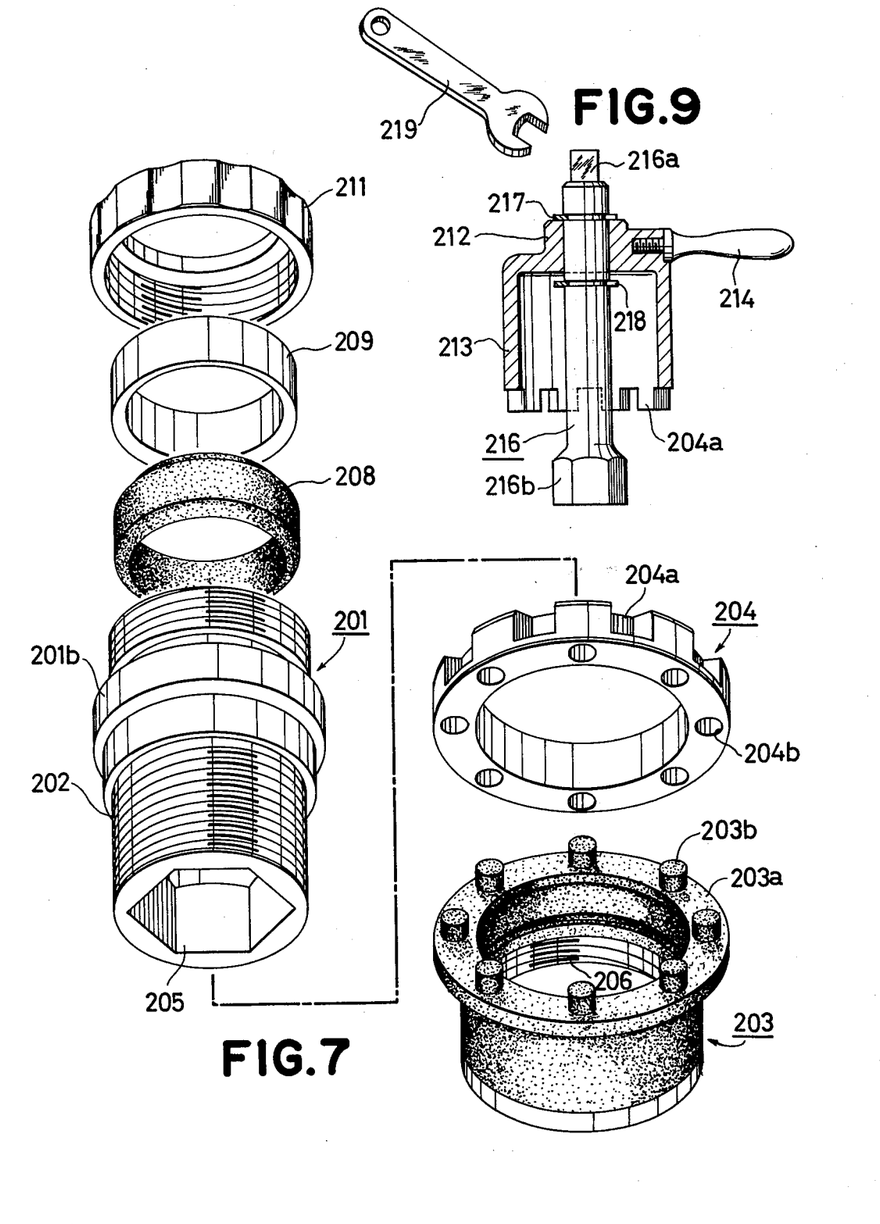
FIG. 7 is a perspective plane view of major parts composing the pipe coupling assembly shown in FIG. 6 in a disassembled disposition.
FIG. 9 is a side plane view of a tool for axially turning the main body incorporated in the pipe coupling aassembly shown in FIG. 6 with a wrench shown in a perspective fashion.
Figure 8:
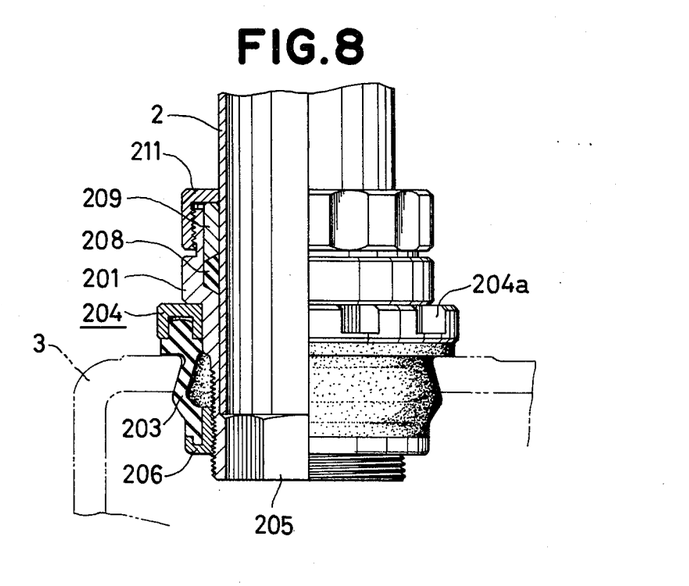
FIG. 8 is a side plane view, half in section, of the pipe coupling assembly shown in FIG. 6 in a disposition after coupling.

Another embodiment of the pipe coupling assembly of the present invention is shown in FIGS. 6, 7 and 8, in which a cylindrical main body 201 is comprised of an outwardly threaded upper part 201a, a flange part 201b formed downwardly integrally of the upper part 201a, a stepped part 201c formed just below the flange part 201b and a lower part 201d formed downwardly integrally of the stepped part 201c. This lower part 201d of the main body 201 is provided with a threaded outer surface 202 and an angled inner surface 205 adapted for engagement with the later described tool for turning the main body 201 from outside.

Embracing the lower part 201d of the main body 201 in partial contact, there is provided a cylindrical body 203 made of a resiliently flexible material. This cylindrical body 203 is provided with an upper ring 204 and a lower ring 206, both being disposed thereon.

One example of the engagement between the cylindrical body 203 and the upper ring 204 is shown in FIG. 7. In the case of this example, the cylindrical body 203 is provided with multiple projections 203b formed on the uppersurface of its upper flange part 203a while the upper ring 204 is provided with multiple hollows 204b formed in the undersurface thereof and adapted for accommodation of the projections 203b of the cylindrical body 203.

This engagement of the upper ring 204 and the cylindrical body 203 may be provided in other modes also. In one modified example, an annular projection is formed on the uppersurface of the flange part 203a of the cylindrical body 203 and, in accordance with this, an annular groove is formed in the undersurface of the upper ring 204. In this case, however, the annular projection of the cylindrical body 203 should be fixed to the wall of the annular groove of the upper ring by a suitable manner such as thermal bonding. In another modified example, a flat uppersurface of the flange part 203a of the cylindrical body 203 is fixed directly to the undersurface of the upper ring 204 by a suitable manner such as thermal bonding.

The upper ring 204 has indentations 204a formed on its outer peripheral surface for engagement with the later described tool for turning the main body 201 of the assembly. The lower ring 206 is fixed to the lower fringe of the cylindrical body 203 and is provided with an inner screw 207 adapted for a screw engagement with the threaded outer surface 202 of the lower part 201d of the main body 201.

The flexible cylindrical body 203 may preferably be further provided with an annular constriction 203c formed in its outer surface at a position just below the upper flange part 203a thereof and an annular constriction 203d formed in its inner surface around the midway of its lower cylindrical part. Provision of these constrictions 203c and 203d well assists the later described diametral inflation of the cylindrical body 203.

A cap ring 211 is screwed over the outwardly threaded upper part 201a of the main body 201, the inner diameter of same being slightly larger than the outer diameter of the pipe 2 to be joined to the objective body wall 3. A pressure ring 209 is inserted inside the upper part 201a of the main body 201 with the uppersurface thereof being in a pressure contact with the undersurface of the flange part of the cap ring 211. The lower opening of the cap ring 211 is downwardly diverged. Some depression are formed on the outer peripheral surface of the cap ring 211 in order to facilitate turninb by hand. An annular seal member 208 is disposed in between the diverged undersurface of the pressure ring 209 and the inner surface of the stepped part 201c of the main body 201. This annular seal member 208 has a wedge-shaped diametral cross sectional profile converging outwardly. The annular seal member 208 is advantageously made of such elastic and flexible materials as rubbers and synthetic resins.

Junction of the assembly of this embodiment with the objective body wall 3 is carried out in a manner substantially the same as that in the case of the foregoing embodiment. This is, the upward movement of the lower ring 206 caused by the axial turning of the main body 201 results in corresponding diametral bending inflation of the flexible cylindrical body 203. By this inflation of the cylindrical body 203, the coupling assembly of the present embodiment is joined to the objective body wall 3 in a water tight disposition.

As shown in FIGS. 6 and 8, the axial length of the flexible cylindrical body 203 is larger than the tickness of the objective body wall 3 and is much greater than the wall thickness of the flexible cylindrical body. In addition, the flexible cylindrical body 203 bends outwardly in the diametrical direction when compressed vertically and, as a result of this bending, the maximum outer diameter of the cylindrical body becomes larger than the outer diameter of the cylindrical body 203 before compression. The outer expansion of the flexible cylindrical body in response to axial compression is clearly shown in FIGS. 6 and 8. In this bending action the cylindrical body bends at a longitudinal position below the undersurface of the objective body wall 3 as shown in FIG. 8.

Due to this special longitudinal position of the bending, the part of the cylindrical body above the bending position snugly contacts the objective body wall 3. In addition, in view of the fact that the bending position is below the undersurface of the objective body wall and the outer diameter of the bending apex of the cylindrical body is larger than the maximum diameter of the whole for reception of the assembly, the assembly is firmly anchored to the objective body wall. Thus, if the upper surface of the objective body wall 3 is considered a water inlet end of a water inlet passage, and the lower end thereof is considered a water outlet ned the bending apex of the cylindrical body 103 expands to a larger diameter than the diameter of the water outlet end of the water inlet passage and prevents accidental vertical release of the assembly even if the objective wall defining the water inlet passage has a uniform axial diameter or has a diameter that decreases in size from the water inlet end to the water outlet end thereof.

In the above-described process for joining the assembly to the objective body wall, the manner of turning the main body 201 is somewhat different from the one in the foregoing embodiment, in which the main body is turned axially by engaging a wrench with the angled outer surface part of the main body. In the case of the present embodiment, a tool such as shown in FIG. 9 is used for the axial turning of the main body 201.

The tool is comprised of legs 213 extending downwardly integral of a boss 212, a handle 214 fixed laterally to the boss 212, an upringt pole 216 carried by the boss 212 in an axially turnable and longitudinally slidable arrangement. This upright pole 216 is provided with an upper angled surface part 216a and a lower angled surface part 216b. Longitudinal sliding of the upright pole 216 is desirably limited by stopper flanges 217 and 218 formed on it spacedly sandwiching the boss of the tool. For the axial turning of the main body 201, the lower ends of the legs 213 of the tool are engaged with the indentations 204a of the upper ring 204 and the lower angled surface part 216a of the upright pole 216 is brought into a snug engagement with the angled inner surface 205 of the main body 201. After this setting, the handle 214 is held stationarily by hand and the upright pole 216 is turned axially via a wrench 219 engaged with the upper angled surface part 216a of the upright pole 216. In this way, as the axial turnings of the cylindrical body 203 and the lower ring 206 are restrained by the fixed engagement of the upper ring 204 with the legs 213 of the tool, only the main body 201 is turned axially and the lower ring 206 is compelled to move upwardly so as to cause the diametral inflation of the flexible cylindrical body 203.

After completion of the coupling of the assembly to the objective body, the water pipe 2 needs to be joined with the assembly of the present embodiment. In this procedure, the water pipe 2 is inserted from the upper side over a prescribed length into the main body 201 and the cap ring 211 is turned by hand. By this turning of the cap ring 211, the pressor ring 209 is depressed and the annular seal member 208 is compressed in between the undersurface of the pressor ring 209 and the inner surface of the stepped part 201c of the main body 201. (see FIG. 8) Due to the outwardly converging wedge-shaped diametral cross sectional profile of the seal member 208, the deformation of the seal member caused by the compression brings the seal member 208 into a tight pressure contact with the outer peripheral surface of the water pipe 2, thereby the water pipe 2 is joined with the pipe coupling assembly of the present embodiment in a water tight disposition.

When the water pipe 2 should be disconnected from the coupling assembly, the cap ring 211 is turned by hand in the direction opposite to that at the time of junction so as to liberate the seal member 208 from the compressed disposition and the water pipe 2 is drawn out of the assembly very easily.

Removal of the assembly from the objective body wall 3 is carried out in a manner substantially the same as that employed in the foregoing embodiment but using the tool shown in FIG. 9.

In the above-described embodiment, the axial turning of the main body 201 can be effected even without using the specially prepared tool shown in FIG. 9. For example, as a substitute for the indentations 204a, the upper ring 204 may be provided with an angled surface formed on its outer peripheral surface. In this case, the axial turnings of the cylindrical body 203 and the lower ring 206 are restrained by engaging a wrench with the angled outer surface of the upper ring 204 and holding the wrench by hand stationarily.

In another example, radial holes may be made in the outer surface of the upper ring 204 in combination with use of a wrench having projections on its head part. In the operation, the projections of the wrench are inserted into the holes of the upper ring 204 and the wrench is held by hand stationarily. Including such various embodiments all, the upper ring 204 is said to ahve "an engagement structure" on its peripheral surface.

Figure 10A:
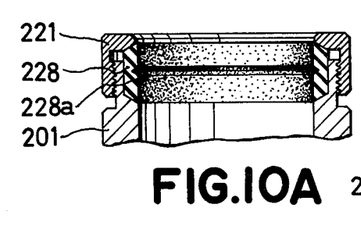
FIG. 10A is a cross sectional side plane view of the main part of a modification of the pipe coupling assembly shown in FIGS. 6 to 8.
Figure 10B:
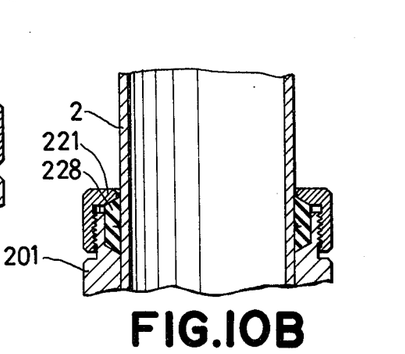
FIG. 10B is a cross sectional side plane view of the main part shown in FIG. 10A in a disposition after coupling.

A modification of the embodiment shown in FIGS. 6 to 8 is shown in FIGS. 10A and 10B, in which the pressor ring 209 used in the foregoing embodiment is omitted. The lower fringe of the flange part of the cap ring 221 is downwardly diverged and the annular seal member 228 is provided with a diametral cross sectional profile substantially the same as that of the seal member 208 used in the foregoing embodiment. The only exception is that an annular constriction 228 is formed in the inner peripheral surface of the seal mamber 228 for the sake of an easier deformation of same. As shown in FIG. 10B, by turning the cap ring 221 axially by hand after insertion of the water pipe 2 into the main body 201 of the assembly, the seal member 228 is brought into a water-tight pressure contact with the pipe surface due to the compression caused by the turning of the cap ring 221.

Figure 11:
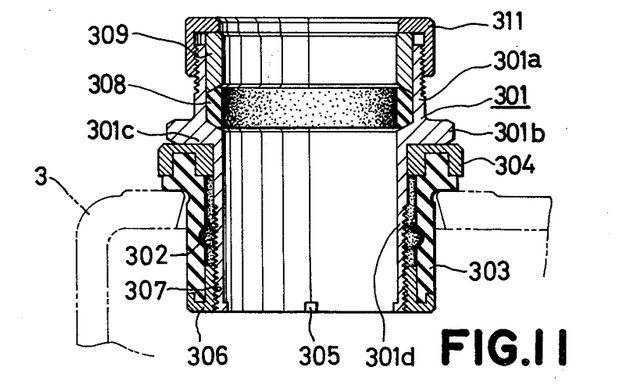
FIG. 11 is a cross sectional side plane view of the other embodiment of the pipe coupling assembly of the present invention.
Figure 12:
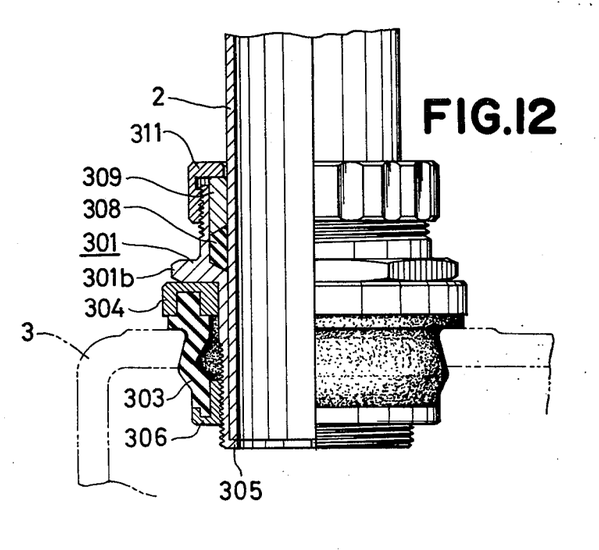
FIG. 12 is a side plane view, half in section, of the pipe coupling assembly shown in FIG. 11 in a disposition after coupling.

A further embodiment of the pipe coupling assembly of the present invention is shown in FIGS. 11 and 12 in which the structure of the mechanism for joining the pipe coupling assembly with the objective body wall is substantially similar to that in the embodiment shown in FIGS. 6 to 8. That is, this mechanism is comprised of a cylindrical main body 301, an upper ring 304, a flexible cylindrical body 303 and a lower ring 306. However, in the case of this embodiment, the main body 301 is provided with an outwardly angled surface part 301b like the embodiment shown in FIGS. 3 to 5 and no angled inner surface is formed on the inner surface of its lower part 301d. This means that the axial turning of the main body 301 for inflation of the flexible cylindrical body 303 is carried out by engaging a wrench with the angled surface part 301b of the main body 301. For this reason, the upper ring 304 is provided with no outer indentations. Further, a plurality of local radially inwardly extending projections 305 are formed in the inner surface of the fringe of the lower part 301d of the main body 301 forming abutments for the water pipe insertion. An annular projection may substitute for the local diametral projections for this purpose.

A cap ring 311, a pressor ring 309 and an annular seal member 308 are combined with the upper part 301a of the main body 301 in a manner similar to that in the embodiment shown in FIGS. 6 to 8.

Junction of the pipe coupling assembly of the present embodiment with the objective body wall is carried out in a manner same as that in the embodiment shown in FIGS. 3 to 5, i.e., the axial turning of the main body 301 is followed by an upward movement of the lower ring 306 due to the screw engagement between the inner screw 307 of the lower ring 306 and the threaded outer surface 302 of the lower part 301d of the main body 301 and this causes corresponding diametral inflation of the flexible cylindrical body 303.

The water pipe 2 is joined with the pipe coupling assembly of this embodiment in a manner the same as that employed in the embodiment shown in FIGS. 6 to 8, i.e., the cap ring 311 provided with a wavy outer peripheral surface is turned by hand in order to compress the annular seal member 308 as shown in FIG. 12.

Figure 13:
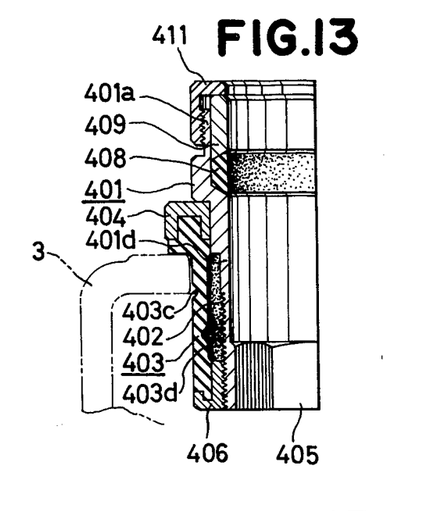
FIG. 13 is a cross sectional side plane view of a part of a further embodiment of the pipe coupling assembly of the present invention.
Figure 14:
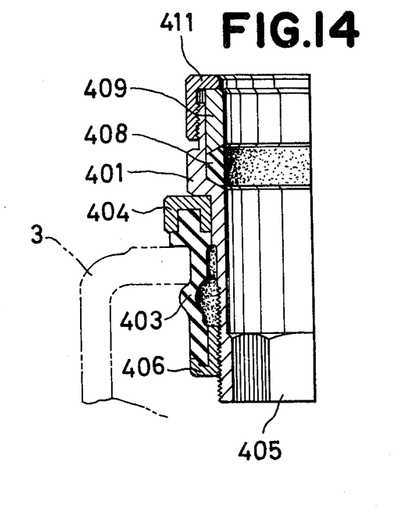
FIG. 14 is a cross sectional side plane view of the part of the pipe coupling assembly shown in FIG. 13 in a disposition after joining with the objective body wall.

A further embodiment of te pipe coupling assembly of the present invention particularly adapted for a junction with an objective body wall having a straight hole for junction is shown in FIGS. 13 and 14. The outline of the structure of this embodiment is similar to that of the embodiment shown in FIGS. 6 to 8. The mechanism for joining the assembly with the water pipe 2 is comprised of a cap ring 411 screwed over the upper part 401a of the main body 401, a pressor ring 409 encased snugly within the upper part 401a of the main body 401 and an annular seal member 408 to be depressed by the pressor ring 408. The main body 401 is provided, on its over part 401d, with a threaded outer surface 402 and an angled inner surface 405 adapted for engagement with a tool such as shown in FIG. 9.

The mchanism for joining the assembly with the objective body wall 3 includes a flexible cylindrical body 403 provided with an upper ring 404 and a lower ring 406 screwed over the lower part 401d of the main body 401. Two constrictions 403c and 403d are formed on the body of the cylindrical body 403. That is, an upper constriction 403c is formed annularly in the outer peripheral surface of the cylindrical body 403 at a position just below the downside fringe of the hole of the objective body wall 3 while a lower constriction 403d is formed annularly in the inner peripheral surface of the cylindrical body 403 at a position about the midway of its lower cylindrical part.

The processes for joining the pipe coupling assembly of this embodiment with the water pipe and with the objective body wall are almost similar to those in the case of the embodiment shown in FIGS. 6 to 8. However, because the upper constriction 403d is positioned spaced from the upper flange part 403a of the main body 403 by a distance almost equal to the thickness of the objective body wall 3 as above-described, the diametral outward inflation of the flexible cylindrical body 403 takes place below the lower fringe of the hole of the objective body wall 3 as shown in FIG. 14.

Figure 15:
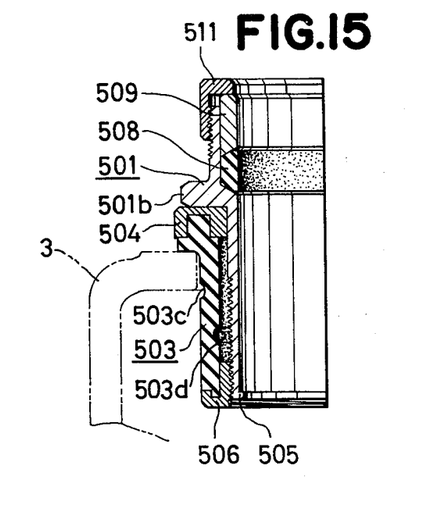
FIG. 15 is a cross sectional side plane view of a part of a further embodiment of the pipe coupling assembly of the present invention.
Figure 16:
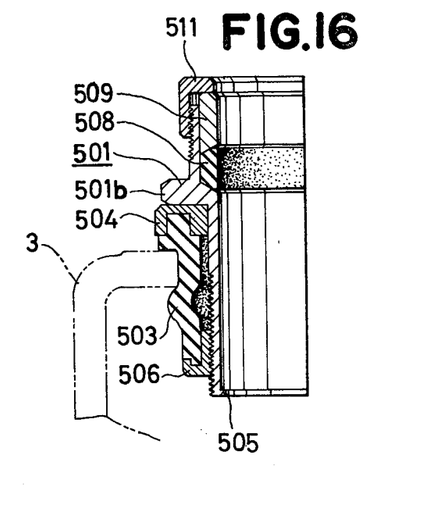
FIG. 16 is a cross sectional side plane view of the part of the pipe coupling assembly shown in FIG. 15 in a disposition after joining with the objective body wall.

A modified combination of the embodiment shown in FIGS. 13 and 14 with the embodiment shown in FIGS. 11 and 12 is shown in FIGS. 15 and 16. The mechanism for joining the assembly with the water pipe is comprised of a cap ring 511 screwed over the upper part 501a of a cylindrical main body 501, a pressor ring 509 encased snugly within the upper part 501a of the main body 501 and an annular seal member 508 to be depressed by the pressor ring 509. The main body 501 is provided with an angled surface part 501b adapted for engagement with wrenches for axially turning the main body 501. In the case of this embodiment, the angled inner surface possessed by the main body of the foregoing embodiment is omitted but an annular projection 505 is formed on the inner surface of the lower fringe of the main body 501 in order to form an abutment for the lower end of the water pipe inserted into the main body 501.

The mechansim for joining the assembly with the objective body wall 3 is comprised of a flexible cylindrical body 503, an upper ring 504 and a lower ring 506. Two constrictions 503c and 503d are formed on the cylindrical body 503 in a disposition same as that in the foregoing embodiment.

The process for joining the assembly with the objective body wall in this embodiment is the same as that in the foregoing embodiment with the exception that the axial turning of themain body is carried out in a manner the same as that in the embodiment shown in FIGS. 11 and 12. On the other hand, process for joining the water pipe with the assembly is carried out in a manner quite the same as that in the foregoing embodiment.

As is well understood from the foregoing description, through employment of the present invention in the coupling process of water pipes with walls of objective bodies such as sanitary appliances, the water pipes can be very stably joined with the objective body walls by simple operations which can be very easily carried out even by unskilled labour. In addition, they can be very easily joined with objective body walls which can be handled from outside only. Further, the water pipes can be very tightly joined with the walls of the objective bodies which are made of such materials as glass, ceramics and synthetic resins.

What is claimed is:

1. An improved pipe coupling assembly usable for sanitary appliances of the type being provided with a liquid inlet passage having an objective body wall defining said liquid inlet passage, a liquid inlet end at one end of said passage and an annular liquid outlet end at an opposite end of said passage comprising in combination, a cylindrical main body, a flexible cylindrical body provided with upper and lower ends and surrounding the lower part of said main body, the flexible cylindrical body normally having an external diameter smaller than the smallest internal diameter of said liquid inlet passage, the axial length of the flexible cylindrical body being longer than the length of said liquid inlet passage, means for diametrically expanding said flexible cylindrical body to an extent wherein the maximum diameter of the flexible cylindrical body exceeds the diameter of the annular liquid outlet end of the liquid inlet passage in response to axial turning of said main body in order to join the lower part of said pipe coupling assembly with the objective body wall, and means for joining the upper part of said main body with a water pipe.

2. An improved pipe coupling assembly as claimed in claim 1 in which said means for expanding said flexible cylindrical body includes means for receiving a wrench whereby said main body may be turned, a threaded outer surface formed on said lower part of said main body, and a lower ring fixed to the lower end of said flexible cylindrical body in a screw engatement with said threaded outer surface on said lower part of said main body.

3. An improved pipe coupling assembly as claimed in claim 2 in which said axial turning causing menas include an angled surface part adapted for engagement with said wrench and formed on the outer surface of said main body at about a midway of its length.

4. An improved pipe coupling assembly as claimed in claim 2 in which said means for receiving a wrench includes an angled inner surface formed on said lower part of said main body and an engagement structure formed on and in an upper ring to an upper end of said flexible cylindrical body.

5. An improved pipe coupling assembly as claimed in claim 4 in which said flexible cylindrical body is provided with multiple projections formed on the upper surface of the upper end part thereof, and said upper ring is provided with multiple hollows formed on the bottom surface thereof for receiving said projections of said flexible cylindrical body.

6. An improved pipe coupling assembly as claimed in claim 4 in which said flexible cylindrical body is provided with an annular projection formed on the upper surface of the upper end part thereof, said upper ring is provided with an annular groove formed on the bottom surface thereof for receiving said annular projection of said flexible cylindrical body, and wherein said annular projection is fixed into said annular groove.

7. An improved pipe coupling assembly as claimed in claim 4 in which the upper surface of said flexible cylindrical body is fixed to the bottom surface of said upper ring.

8. An improved pipe coupling assembly as claimed in claim 4 in which said engagement structure comprises indentations formed on said outer peripheral surface of said upper ring.

9. An improved pipe coupling assembly as claimed in claim 4 in which said engagement structure comprises an angled surface adapted for engagement with a wrench and formed on the outer periphery of said upper ring.

10. An improved pipe coupling assembly as claimed in claim 4 in which said engagement structure comprises radial holes formed in the outer surface of said upper ring.

11. An improved pipe coupling assembly as claimed in claim 1 in which constrictions are formed in the outer and inner peripheral surfaces of said flexible cylindrical body in order to assist diametrical expansion of the latter.

12. An improved pipe coupling assembly as claimed in claim 11 in which the outer one of said constrictions is formed at a position below an upper flange part of said flexible cylindrical body by a distance slightly larger than the thickness of said objective body wall.

13. An improved pipe coupling assembly as claimed in claim 11 in which an outer one of said constrictions is formed at a position just below an upper end part of said flexible cylindrical body.

14. An improved pipe coupling assembly as claimed in claim 13 in which an inner one of said constrictions is formed at a position below the undersurface level of an upper end part of said flexible cylindrical body by a distance slightly larger than the thickness of said objective body.

15. An improved pipe coupling assembly as claimed in claim 1 in which said joining means include a catcher ring incorporated within said upper part of said main body, means for resiliently reducing the inner diameter of said catcher ring, means for provisionally deforming said catcher ring so as to enlarge said inner diameter thereof larger than the outer diameter of said water pipe and an annular seal member disposed below said inner diameter reducing means.

16. An improved pipe coupling assembly as claimed in claim 15 in which said inner diameter reducing means include a guide ring of an inversed L-shaped radial cross sectional profile and placed below said catcher ring and means for resiliently urging said guide ring towards said catcher ring.

17. An improved pipe coupling assembly as claimed in claim 15 in which said catcher ring deforming means include a movable piece placed above said catcher ring in an axially slidable disposition and means for restraining the free axial movement of said movable piece.

18. An improved pipe coupling assembly as claimed in claim 1 in which said joining means include a cap ring screwed over a, threaded outer surface of said upper part of said mmain body and an annular seal member encased within said upper part while resting on the inner surface of a stepped part of said main body and having an outwardly converging wedge-shaped radial cross-sectional profile.

19. An improved pipe coupling assembly as claimed in claim 18 in which said cap ring is provided with depressions in an outer peripheral surface thereof.

20. An improved pipe coupling assembly as claimed in claim 18 in which said cap ring has an inner fringe undersurface in a direct pressure contact with the upper surface of said annular seal member.

21. An improved pipe coupling assembly as claimed in claim 18 further comprising a pressure ring inserted between said cap ring and said annular seal member.

22. An improved pipe coupling assembly as claimed in claim 18 in which said annular seal member is provided with an annular constriction formed in the inner peripheral surface thereof.

23. An improved pipe coupling assembly usable for sanitary appliances comprising, in combination, a cylindrical main body having an upper part, a lower part and a stepped part integrally connecting said two parts, said lower part being provided with an angled inner surface; a flexible cylindrical body surrounding said lower part of said main body; an upper ring on an upper end of said flexible cylindrical body and having indentations formed on the outer peripheral surface thereof; a lower ring fixed to a lower end of said flexible cylindrical body in a screw engagement with a threaded outer surface formed on said lower part of said main body; a cap ring screwed over a threaded outer surface of said upper part of said main body; an annular seal member encased within said upper part while resting on the inner surface of said stepped part of said main body and having an outwardly converging wedge-shaped radial cross-sectional profile, said annular seal member being provided with an annual constriction formed in the inner peripheral surface thereof; and a pressure ring inserted between said cap ring and said annular seal member.

* * * * *